United States Patent
Mitchell et al.

(10) Patent No.: US 9,213,147 B2
(45) Date of Patent: Dec. 15, 2015

(54) FLOATING FIBER OPTIC PIN CONTACT ASSEMBLY HAVING A FERRULE CAPABLE OF MOVEMENT WITHIN A MULTI-PIECE BODY OF THE CONTACT ASSEMBLY

(71) Applicant: Sabritec, Irvine, CA (US)

(72) Inventors: Daniel M. Mitchell, Lake Forest, CA (US); Mehrdad Ghara, Aliso Viejo, CA (US)

(73) Assignee: Sabritec, Costa Mesa, CA (US)

( * ) Notice: Subject to any disclaimer, the term of this patent is extended or adjusted under 35 U.S.C. 154(b) by 465 days.

(21) Appl. No.: 13/668,763

(22) Filed: Nov. 5, 2012

(65) Prior Publication Data

US 2013/0114931 A1    May 9, 2013

Related U.S. Application Data

(60) Provisional application No. 61/557,253, filed on Nov. 8, 2011.

(51) Int. Cl.
  *G02B 6/36*    (2006.01)
  *G02B 6/38*    (2006.01)

(52) U.S. Cl.
  CPC ............ *G02B 6/3833* (2013.01); *G02B 6/3869* (2013.01); *G02B 6/3874* (2013.01)

(58) Field of Classification Search
  CPC ... G02B 6/3833; G02B 6/3874; G02B 6/3869
  USPC ........................................................ 385/78
  See application file for complete search history.

(56) References Cited

U.S. PATENT DOCUMENTS

| | | | |
|---|---|---|---|
| 3,947,182 A | | 3/1976 | McCartney |
| 4,964,490 A | * | 10/1990 | Watanabe ................. 188/73.44 |
| 5,719,977 A | * | 2/1998 | Lampert et al. ................. 385/60 |
| 6,213,750 B1 | * | 4/2001 | Dean et al. ..................... 425/183 |
| 6,505,976 B1 | * | 1/2003 | Grois et al. ...................... 385/78 |
| 7,008,270 B1 | | 3/2006 | Huh et al. |
| 7,172,458 B2 | | 2/2007 | Van Der Mee et al. |
| 8,066,436 B2 | * | 11/2011 | Hamblin ......................... 385/72 |
| 2002/0186931 A1 | | 12/2002 | Seo et al. |
| 2010/0150503 A1 | | 6/2010 | Hamblin |

FOREIGN PATENT DOCUMENTS

| | | | |
|---|---|---|---|
| GB | 2472584 | | 2/2011 |
| JP | 2006154086 | | 6/2006 |
| JP | 2006154086 A | * | 6/2006 |
| KR | 100773175 | | 11/2007 |

* cited by examiner

*Primary Examiner* — Akm Enayet Ullah
(74) *Attorney, Agent, or Firm* — Snell & Wilmer LLP

(57) ABSTRACT

A floating fiber optic pin contact including a ceramic ferrule defining a glass fiber channel for allowing light beams to pass therethrough. The ceramic ferrule has an end portion with a first diameter and a body portion with a second diameter that is smaller than the first diameter. The floating fiber optic pin contact also including a multi-piece body having an inner body member in physical contact with the body portion of the ceramic ferrule and an outer body member not in physical contact with the body portion of the ceramic ferrule and spaced apart from the inner body member. The floating fiber optic pin contact also including a washer connected between the inner body member and the outer body member.

18 Claims, 6 Drawing Sheets

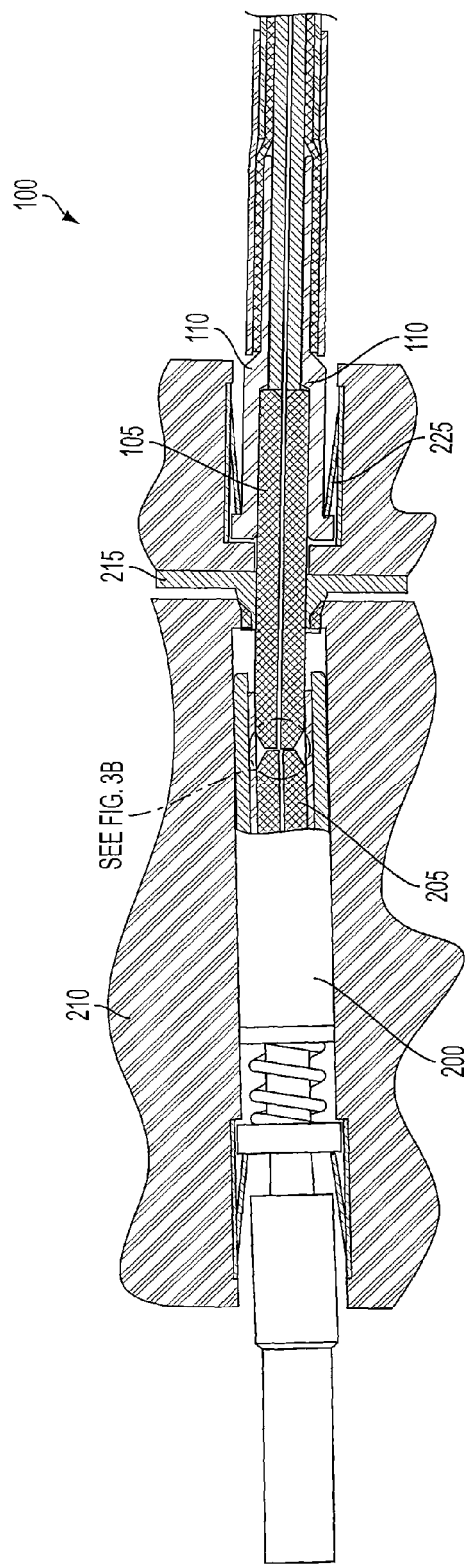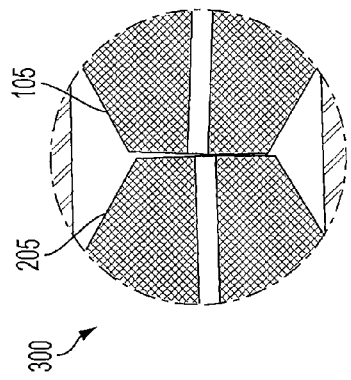

FLOATING FIBER OPTIC PIN CONTACT ASSEMBLY HAVING A FERRULE CAPABLE OF MOVEMENT WITHIN A MULTI-PIECE BODY OF THE CONTACT ASSEMBLY

CROSS REFERENCE TO RELATED APPLICATIONS

This application claims the benefit and priority of U.S. Provisional Application No. 61/557,253, filed on Nov. 8, 2011, the entire contents of which are hereby incorporated by reference.

BACKGROUND

1. Field

The present invention generally relates to fiber optic contacts and improvements thereof. More particularly, the present invention relates to a floating fiber optic pin contact that allows for more accurate alignment between a pin and a socket.

2. Description of the Related Art

FIG. 1 is a cross-sectional side view of a conventional fiber optic pin contact 100. The fiber optic pin contact 100 may conform to typical industry designs, such as MIL-PRF-29504/4. The fiber optic pin contact 100 includes a ceramic ferrule 105 positioned within a one-piece contact body 110. Light beams travel through a glass fiber 125 of a fiber optic cable 115. The ceramic ferrule 105 is generally cylindrical in shape and is tightly fit into the one-piece contact body 110 for being held in place. Similarly, the one-piece contact body 110 is generally cylindrical in shape. When the ceramic ferrule 105 is positioned within the one-piece contact body 110, the ceramic ferrule 105 is in physical contact with the one-piece contact body 110. The one-piece contact body 110 has flanges 111 that extend outward. The fiber optic cable 115 covers a portion of the one-piece contact body 110, and a shrink sleeve 120 covers the fiber optic cable 115. The shrink sleeve 120 is used to terminate the fiber optic cable 115 to the one-piece contact body 110.

FIG. 2 is a cross-sectional side view of the fiber optic pin contact 100 mated with a conventional fiber optic socket contact 200. A mating connector insert 210 may be used to house the fiber optic socket contact 200. The fiber optic socket contact 200 includes a ceramic ferrule 205 that mates with or contacts the ceramic ferrule 105 of the fiber optic pin contact 100. When the fiber optic pin contact 100 is inserted into the fiber optic socket contact 200, retention clips 225 are used to hold or lock the flanges 111 in place. An interfacial sealing member 215 exists as an integral part of the connector assembly 211. In the mated condition, the interfacial sealing member 215 compresses against the mating connector insert 210 thus restricting the fiber optic pin contact 100 from self-aligning to or with the fiber optic socket contact 200.

The ceramic ferrule 205 must be perfectly aligned with the ceramic ferrule 105 in order for light beams to accurately and properly transition or travel from the ceramic ferrule 105 to the ceramic ferrule 205 and vice versa. In other words, if the ceramic ferrule 105 is not exactly aligned with the ceramic ferrule 205, some of the light beams will not travel through the glass fiber 125 from the ceramic ferrule 105 to the ceramic ferrule 205 and vice versa. This will result in some or all of the data not being transmitted from the ceramic ferrule 105 to the ceramic ferrule 205 and vice versa. FIG. 2 depicts a theoretical perfect cavity to cavity alignment, resulting in a theoretical perfect alignment between the ceramic ferrule 205 and the ceramic ferrule 105.

FIG. 3A is a cross-sectional side view of the fiber optic pin contact 100 mated with a fiber optic socket contact 200 illustrating misalignment of the ceramic ferrules 105 and 205. The interference between the interfacial sealing member 215 and the mating connector insert 210 restricts movement of the ceramic ferrule 105 within the cavity.

FIG. 3B illustrates a magnified view of the interface 300 between ceramic ferrules 105 and 205. For illustrative purposes, FIG. 3B depicts an exaggerated misalignment. The misalignment of the ceramic ferrules 105 and 205 is due to the misalignment of the contact cavities and the inability of the ceramic ferrule 105 to move within the cavity. This causes a degradation of system performance in regards to signal transmission and integrity.

SUMMARY

A floating fiber optic pin contact including a ceramic ferrule defining a glass fiber channel for allowing light beams to pass therethrough. The ceramic ferrule has an end portion with a first diameter and a body portion with a second diameter that is smaller than the first diameter. The floating fiber optic pin contact also including a multi-piece body having an inner body member in physical contact with the body portion of the ceramic ferrule and an outer body member not in physical contact with the body portion of the ceramic ferrule and spaced apart from the inner body member. The floating fiber optic pin contact also including a washer connected between the inner body member and the outer body member.

BRIEF DESCRIPTION OF THE DRAWINGS

Other systems, methods, features, and advantages of the present invention will be or will become apparent to one with skill in the art upon examination of the following figure and detailed description. It is intended that all such additional systems, methods, features, and advantages be included within this description, be within the scope of the present invention, and be protected by the accompanying claims. Component parts shown in the drawing are not necessarily to scale, and may be exaggerated to better illustrate the important features of the present invention. In the drawing, like reference numerals designate like parts throughout different views, wherein:

FIG. 3A is a cross-sectional side view of the fiber optic pin contact mated with a fiber optic socket contact illustrating misalignment of the ceramic ferrules.

FIG. 3B is a magnified view of the interface between the fiber optic pin contact and the fiber optic socket contact of FIG. 3A.

DETAILED DESCRIPTION

Figure 4:
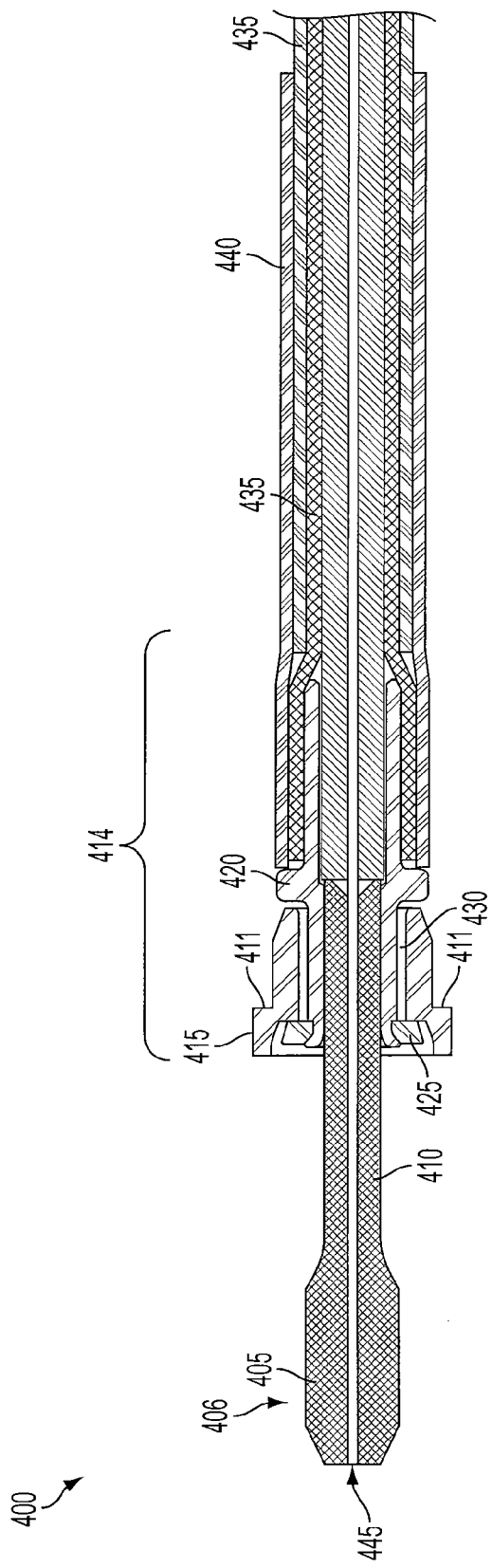
FIG. 4 is a cross-sectional side view of a fiber optic pin contact according to an embodiment of the invention.

FIG. 4 is a cross-sectional side view of a fiber optic pin contact 400 according to an embodiment of the invention. The fiber optic pin contact 400 may be interchangeable with MIL-PRF-29504/4 contacts. The fiber optic pin contact 400 includes a ceramic ferrule 405 positioned within a multi-piece body 414. The ceramic ferrule 405 has an end portion 406 and a body portion 410. The end portion 406 is generally cylindrical in shape and has a first diameter. The body portion 410 is generally cylindrical in shape and has a second diameter. The second diameter is smaller than the first diameter. The body portion 410 has an undercut to eliminate restriction of the movement of the ceramic ferrule 405 when the ceramic ferrule 405 is coupled to the fiber optic socket contact 200.

The multi-piece body 414 has an outer body member 415 and an inner body member 420. The inner body member 420 is in direct physical contact with the body portion 410 of the ceramic ferrule 405. The inner body member 420 is concentrically positioned around the entire body portion 410 of the ceramic ferrule 405.

The outer body member 415 does not physically contact the inner body member 420 but rather is spaced apart from the inner body member 415, thus producing a gap 430 between the inner body member 420 and the outer body member 415. The outer body member 415 is spaced apart from the inner body member 420 using a washer or retainer 425. The washer or retainer 425 is used to hold the outer body member 415 in place and prevent it from moving away from the inner body member 420. The gap 430 allows for radial and angular float or movement of the ceramic ferrule 405. The radial and angular float or movement of the ceramic ferrule 405 allows for better contact and alignment between the ceramic ferrule 405 and the ceramic ferrule 205. The outer body member 415 fits within a retention mechanism 225 inside the connector insert or assembly 211.

Light beams travel through a glass fiber 445 of the ceramic ferrule 405. The ceramic ferrule 405 is generally cylindrical in shape and is tightly fit into the inner body member 420 for being held in place. Similarly, the inner body member 420 is generally cylindrical in shape. When the ceramic ferrule 405 is positioned within the inner body member 420, the ceramic ferrule 405 is in physical contact with the inner body member 420. The outer body member 415 has flanges 411 that extend outward. The fiber optic pin contact 400 also includes a fiber optic cable 435 that covers a portion of the inner body member 420, and a shrink sleeve 440 that covers the fiber optic cable 435. The shrink sleeve 440 is used to terminate the fiber optic cable 435 to the inner body member 420.

Figure 1:
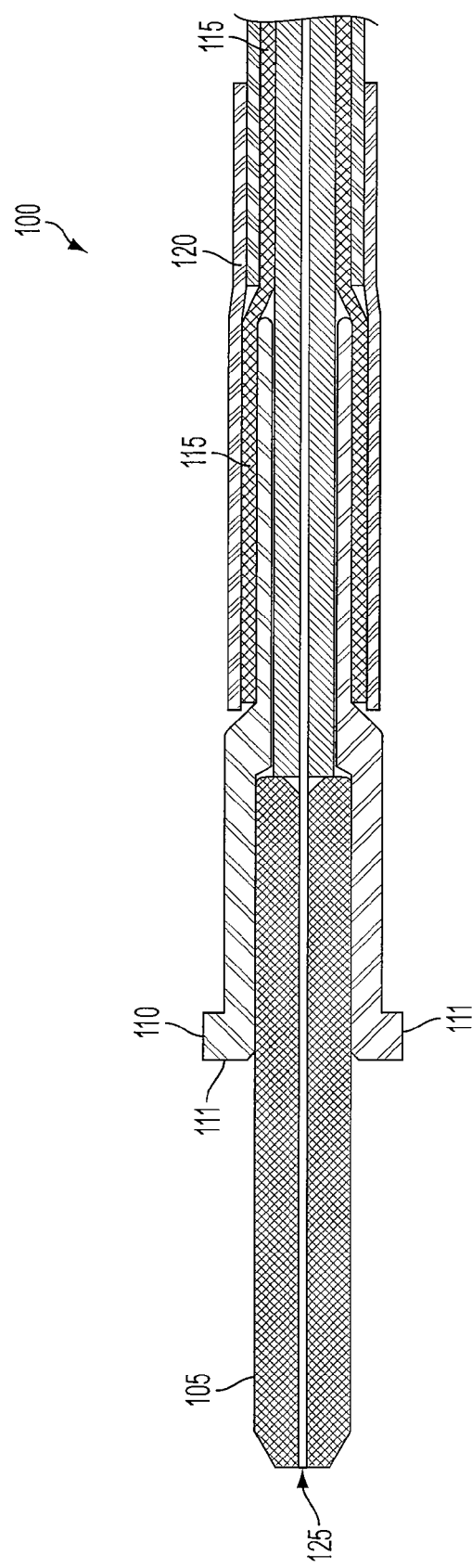
FIG. 1 is a cross-sectional side view of a conventional fiber optic pin contact.
Figure 2:
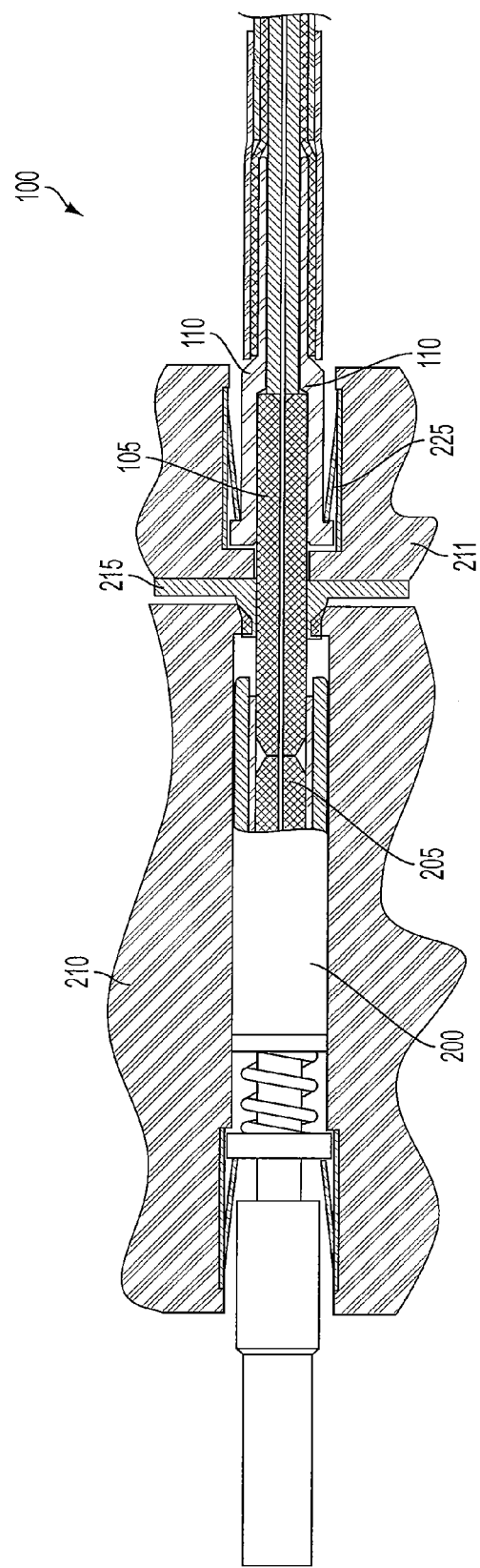
FIG. 2 is a cross-sectional side view of the fiber optic pin contact mated with a conventional fiber optic socket contact in a theoretical perfect alignment.
Figure 5:
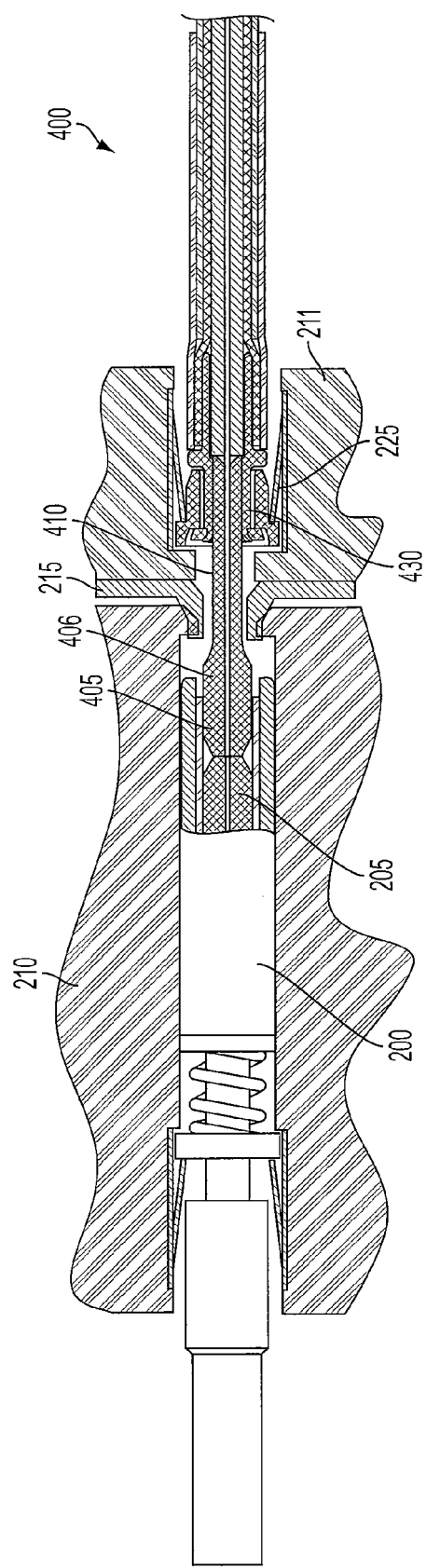
FIG. 5 is a cross-sectional side view of the fiber optic pin contact of FIG. 4 mated with a fiber optic socket contact.

FIG. 5 is a cross-sectional side view of the fiber optic pin contact 400 of FIG. 4 mated with a fiber optic socket contact 200. The mating connector insert 210 may be used to house the fiber optic socket contact 200. The ceramic ferrule 205 mates with or contacts the ceramic ferrule 405 of the fiber optic pin contact 400. When the fiber optic pin contact 400 is inserted into the fiber optic socket contact 200, the retention clips 225 are used to hold or lock the outer body portion 415 in place. The gap 430 between the inner body portion 420 and the outer body portion 415 allows for better alignment of the ceramic ferrule 405 with the ceramic ferrule 205. The gap 430 allows additional contact alignment float beyond what is available between the ceramic ferrule 105 and the interfacial sealing member 215 in FIG. 2. The radial and angular float or movement of the ceramic ferrule 405 allows for better contact and alignment between the ceramic ferrule 405 and the ceramic ferrule 205. However, FIG. 5 illustrates a theoretical perfect cavity to cavity alignment.

Figure 6A:
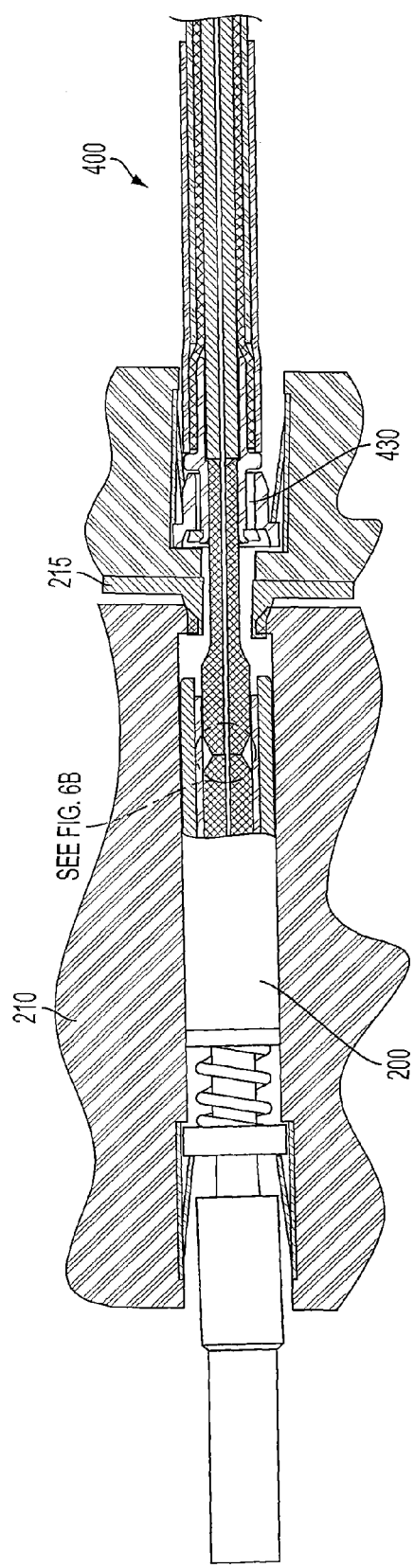
FIG. 6A is a cross-sectional side view of the fiber optic pin contact of FIG. 4 mated with a fiber optic socket contact illustrating minimal to no misalignment of the ceramic ferrules.

FIG. 6A is a cross-sectional side view of the fiber optic pin contact 400 of FIG. 4 mated with a fiber optic socket contact 200 illustrating minimal to no misalignment of the ceramic ferrules 405 and 205 despite cavity to cavity misalignment. Fiber optic pin contact 400 is not inserted perfectly straight into the fiber optic socket contact 200, placing the ceramic ferrule 405 closer to one side of the interfacial sealing member 215 than the other side. Whereas in FIG. 3, the interference between the interfacial sealing member 215 and the ceramic ferrule 105 restricts float, the undercut in the body portion 410 relieves the interference between the interfacial sealing member 215 and the ceramic ferrule 405, as seen in FIG. 6. The relieved interference allows some radial and angular float of the ceramic ferrule 405. The gap 430 further allows radial and angular float.

Figure 6B:
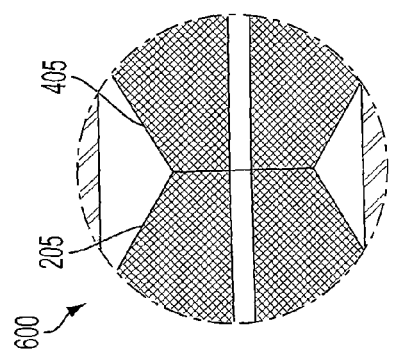
FIG. 6B is a magnified view of the interface between the fiber optic pin contact and the fiber optic socket contact of FIG. 6A.

FIG. 6B illustrates a magnified view of the interface 600 between the ceramic ferrules 405 and 205. The more accurate alignment of the ceramic ferrules 405 and 205 is due to (a) the float created by the body portion 410 of the ceramic ferrule 405 having an undercut or smaller diameter than the end portion 406 and/or (b) the gap 430 and movement created by using the multi-piece body 414 such that the inner body member 420 can move relative to the outer body member 415. Despite misalignment of the contact cavities, the ceramic ferrule 405 can move within the cavity of the fiber optic socket contact 200 to better align with the ceramic ferrule 205. This causes better system performance in regards to signal transmission and integrity.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A floating fiber optic pin contact comprising:
    a ceramic ferrule defining a glass fiber channel for allowing light beams to pass therethrough, the ceramic ferrule having an end portion having a curved exterior surface with a first diameter and a body portion having a curved exterior surface with a second diameter that is smaller than the first diameter;
    a multi-piece body having an inner body member in physical contact with the body portion of the ceramic ferrule and an outer body member not in physical contact with the body portion of the ceramic ferrule and spaced apart from the inner body member; and
    an annular retaining member connected with the inner body member and with the outer body member, the annular retaining member positioned around the body portion of the ceramic ferrule, a gap being formed between the inner body member and the outer body member, the gap surrounding at least a portion of the curved exterior surface of the body portion of the ceramic ferrule, for allowing radial and angular movement of the ceramic ferrule with respect to the outer body member.

2. The floating fiber optic pin contact of claim 1, wherein the second diameter is defined by an undercut in the ceramic ferrule.

3. The floating fiber optic pin contact of claim 1, wherein the inner body member is concentrically positioned around an entire circumference of the body portion.

4. The floating fiber optic pin contact of claim 1, wherein the outer body member is concentrically positioned around the inner body member.

5. The floating fiber optic pin contact of claim 1, further comprising a fiber optic cable covering a portion of the inner body member.

6. The floating fiber optic pin contact of claim 1, wherein the outer body member further comprises at least one flange that extends outward.

7. The floating fiber optic pin contact of claim 1, wherein the annular retaining member is a washer configured to space apart the inner body member and the outer body member.

8. The floating fiber optic pin contact of claim 1, wherein the gap between the inner body member and the outer body member allows the ceramic ferrule to move within a cavity of a fiber optic socket contact.

9. A floating fiber optic pin contact comprising:
a ceramic ferrule defining a glass fiber channel for allowing light beams to pass therethrough, the ceramic ferrule having an end portion having a curved exterior surface with a first diameter and a body portion having a curved exterior surface with a second diameter that is smaller than the first diameter;
a multi-piece body having an inner body member in physical contact with the body portion of the ceramic ferrule and an outer body member not in physical contact with the body portion of the ceramic ferrule and spaced apart from the inner body member;
a fiber optic cable covering a portion of the inner body member; and
an annular retaining member connected with the inner body member and with the outer body member, the annular retaining member positioned around the body portion of the ceramic ferrule, a gap being formed between the inner body member and the outer body member, the gap surrounding at least a portion of the curved exterior surface of the body portion of the ceramic ferrule, for allowing radial and angular movement of the ceramic ferrule with respect to the outer body member.

10. The floating fiber optic pin contact of claim 9, further comprising a shrink sleeve covering the fiber optic cable.

11. The floating fiber optic pin contact of claim 10, wherein the shrink sleeve terminates the fiber optic cable to the inner body member.

12. The floating fiber optic pin contact of claim 9, wherein the outer body member fits within a retention mechanism inside a fiber optic socket connector insert.

13. The floating fiber optic pin contact of claim 9, wherein the outer body member further comprises at least one flange that extends outward.

14. A floating fiber optic pin contact comprising:
a ceramic ferrule defining a glass fiber channel for allowing light beams to pass therethrough, the ceramic ferrule having an end portion having a curved exterior surface with a first diameter and a body portion having a curved exterior surface with a second diameter that is smaller than the first diameter;
a multi-piece body having an inner body member in physical contact with the body portion of the ceramic ferrule and an outer body member not in physical contact with the body portion of the ceramic ferrule, the outer body member concentrically positioned around the inner body member;
a fiber optic cable covering a portion of the inner body member; and
an annular retaining member connected with the inner body member and with the outer body member, the annular retaining member positioned around the body portion of the ceramic ferrule, a gap being formed between the inner body member and the outer body member, the gap surrounding at least a portion of the curved exterior surface of the body portion of the ceramic ferrule, for allowing radial or angular movement of the ceramic ferrule and the inner body member with respect to the outer body member.

15. The floating fiber optic pin contact of claim 14, wherein the gap between the inner body member and the outer body member allows the ceramic ferrule to move within a cavity of a fiber optic socket contact.

16. The floating fiber optic pin contact of claim 14, wherein the second diameter is defined by an undercut in the ceramic ferrule.

17. The floating fiber optic pin contact of claim 14, wherein the inner body member is concentrically positioned around an entire circumference of the body portion.

18. The floating fiber optic pin contact of claim 14, wherein the outer body member further comprises at least one flange that extends outward.

* * * * *